(12) United States Patent
Shao et al.

(10) Patent No.: US 8,788,431 B1
(45) Date of Patent: Jul. 22, 2014

(54) METHODS AND APPARATUS FOR GRAPHICAL ANALYSIS AND DISPLAY OF REAL PROPERTY INFORMATION

(75) Inventors: Henry K. Shao, San Francisco, CA (US); Daniel S. Lorimer, Palo Alto, CA (US); Sunil Singh, Palo Alto, CA (US); Chester Day, San Francisco, CA (US)

(73) Assignee: Movoto LLC, Redwood City, CA (US)

( * ) Notice: Subject to any disclaimer, the term of this patent is extended or adjusted under 35 U.S.C. 154(b) by 1162 days.

(21) Appl. No.: 11/552,859

(22) Filed: Oct. 25, 2006

Related U.S. Application Data

(60) Provisional application No. 60/730,940, filed on Oct. 26, 2005.

(51) Int. Cl.
  *G06Q 50/10* (2012.01)
  *G09G 5/10* (2006.01)
(52) U.S. Cl.
  USPC ............................................ 705/313; 345/629
(58) Field of Classification Search
  USPC .................... 705/1.1, 313; 345/629
  See application file for complete search history.

(56) References Cited

U.S. PATENT DOCUMENTS

| 6,343,290 B1* | 1/2002 | Cossins et al. ...................... 1/1 |
| 2007/0055652 A1* | 3/2007 | Hood et al. ....................... 707/3 |

OTHER PUBLICATIONS

Information on Realtor WorkStation, printed 2004, Metropolitan Regional Information System.*

* cited by examiner

*Primary Examiner* — Naresh Vig
(74) *Attorney, Agent, or Firm* — Jackson Walker L.L.P.

(57) ABSTRACT

A computer-implemented method for manipulating real property data for a plurality of properties is provided. The computer-implemented method includes identifying boundary specifications for clustering the plurality of properties, thereby forming a plurality of basic data blocks. Each of the plurality of data blocks corresponds to a subset of the plurality of properties and has boundaries delineated in accordance with the boundary specifications. The computer-implemented method also includes identifying a common attribute among properties in each of the plurality of basic data blocks. The computer-implemented method further includes representing each of the plurality of basic data blocks with a respective attribute value associated with the common attribute. The computer-implemented method yet also includes assigning attribute values of the plurality of basic data blocks with visual representations of a visual representation scale, thereby representing the plurality of basic data blocks as non-opaque visual overlays.

24 Claims, 18 Drawing Sheets

(Unprocessed Image)

(Data processed with Gaussian Filter)

(Data processed with Median Filter)

(Data processed with Mean Filter)

(Unprocessed Image)

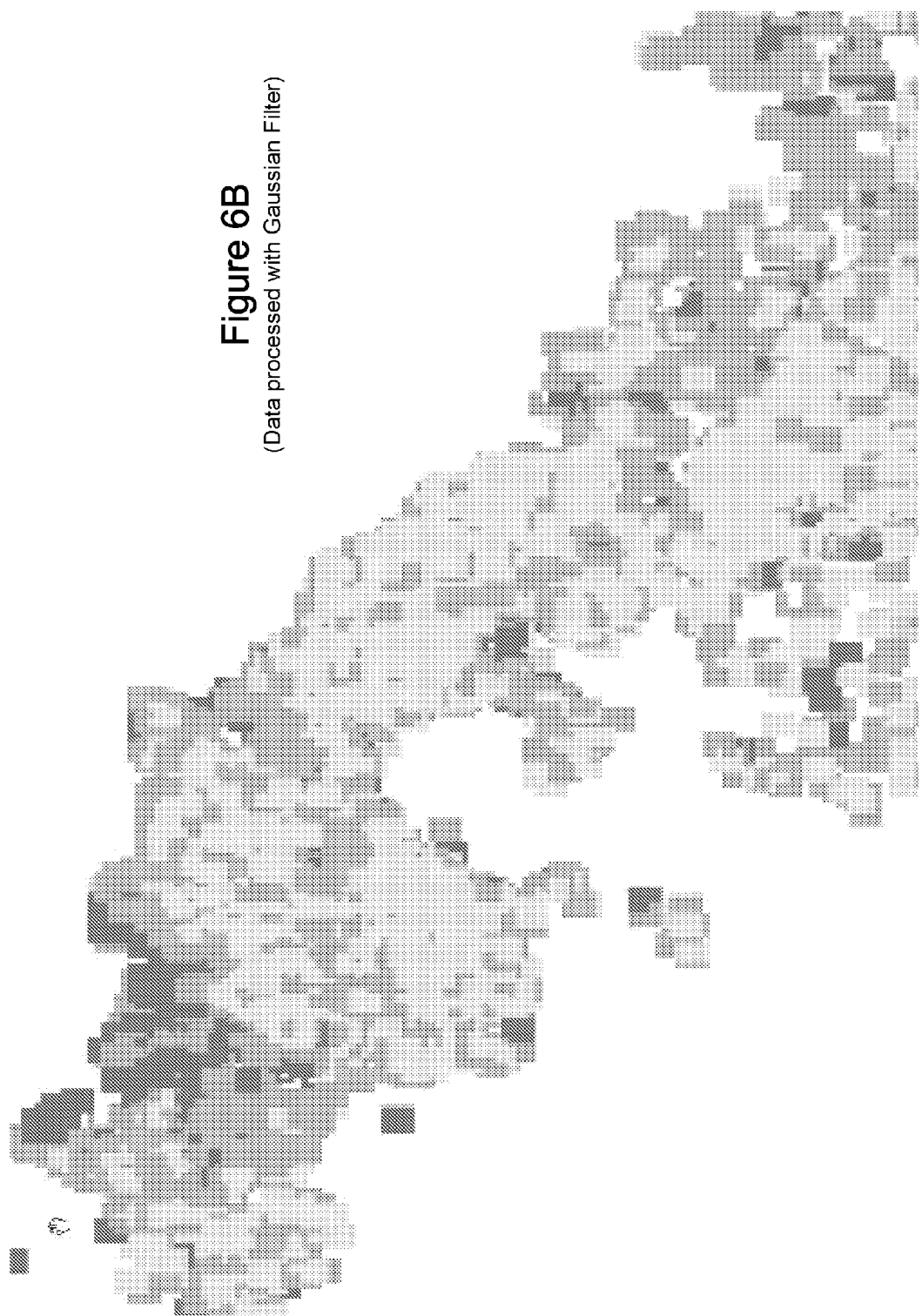

(Data processed with Median Filter)

(Data processed with Mean Filter)

METHODS AND APPARATUS FOR GRAPHICAL ANALYSIS AND DISPLAY OF REAL PROPERTY INFORMATION

PRIORITY CLAIM

This application is related to and claims priority under 35 U.S.C. §119(e) to a commonly assigned provisional patent application entitled "Method and Apparatus for Graphical Analysis and Display of Real Property Information," by Shao et al., Application Ser. No. 60/730,940 filed on Oct. 26, 2005, all of which are incorporated herein by reference.

FIELD

This invention relates to a computer system and method for efficiently depicting real property attributes in a geographical area (e.g., the United States or Palo Alto, Calif.). The invention assists users in locating desirable real estate while minimizing traditional dependencies based solely upon human-based knowledge and recollection that is normally gathered over years of neighborhood site visits by conventional real estate agents.

BACKGROUND

The residential real-estate industry in the US has $1.6T in annual sales and $60B in annual gross brokerage commissions. The residential real estate brokerage industry has traditionally been very labor intensive and the industry relies heavily on individual real estate agents working as independent contractors to recruit service and to manage business transactions. The fact that these real estate agents operate independently and that most real estate brokerage operations are focused on short-term profitability has led to under-investment in efficiency-enhancing technologies and processes for these businesses. The industry has generally lagged behind other industries in terms of its use of state-of-the-art computer and Internet technologies for productivity gain and product or service differentiation.

A. Repetitive Tasks of Agents

The daily tasks that are performed by real estate agents are repetitive and time-consuming. This inefficiency is accentuated by the fact that virtually every home on the market is unique, every location of home sites has distinguishing characteristics, and the conditions and situations of every sale have been different. New or resale homes come on the market on a daily basis. Buyers' agents usually visit homes on the market and match these homes with their clients' requirements. The agents match these homes against various criteria like the size of the home; the amenities of the individual rooms of the homes; the location of the properties; the availability of commercial services such as restaurants, coffee shops, grocery stores, etc.; the suitability of schools; the proximity to transportation infrastructure; the condition of the other homes in the neighborhood and many other factors. A lot of the times the agents have to physically preview properties to get an accurate assessment of these factors. Having to physically visit these properties is a very time consuming activity.

B. Spread of Housing Geographic Area Targets

In the United States, residential real estate values have risen greatly in recent years, outpacing the increase in income levels of the general population. As a result, housing affordability has diminished significantly, especially in the Northeast and West Coast regions of the United States. This phenomenon has forced many buyers, especially first-time buyers, to search for homes in larger geographic areas, including farther-flung suburban communities. This geographic expansion presents a new problem for real estate agents, as real estate agents traditionally have typically concentrated on a small area covering a limited number of cities. Real estate agents often do not have intimate knowledge of every area where their clients may wish to search for homes, and they therefore cannot provide good service and support to their clients—at least not efficiently.

C. Quality of Service Provided by New Agents

A similar problem exists when a new real estate agent joins the industry. They may not possess the knowledge of local neighborhoods and thus it may be difficult for them to provide good quality service. As a result these new agents have to spend an unaffordable amount of time researching the areas and properties, or else they may not be able to provide a desirable quality of service to their clients. This learning curve presents a significant overhead cost for the real estate brokerages in bringing in new agents, and the impact on quality of service may affect the brand value of the operation.

D. Property Information Database and its Limited Data

When properties come on the market for sale, properties are generally listed in a real estate professional community-owned system. The Property Information Database (PID) system that is used in most parts of the United States is called a Multiple Listing Service (MLS). For the purpose of discussions in this document, a PID refers generically to the various kinds of Property Information Databases such as a MLS database, or other similar kinds of databases containing real estate listing property information. These PID systems are individually owned by local Realtor associations, and they include some basic data for each listed property. The listing data is usually hosted on some computer database that is run by a separate company and is accessed remotely over the Internet by individual agents. When a real estate agent obtains an agreement to sell a property, the agent usually puts information about that property into a PID system immediately so that other agents can view that information. The completeness and accuracy of the information about a property on the market depends on what data the listing agent inputs. Frequently this information in the PID databases is not accurate, or some pertinent information is missing. This inconsistent availability of data presents a challenge for the real estate agent trying to serve the buyer, and for the buying clients themselves, because they cannot assess the suitability of in inadequately listed property very easily. They may then have to physically visit such properties to evaluate their suitability. Again, this presents a cost and efficiency challenge for both the agent and the buying client.

E. Use of Computing Power

The real estate brokerage industry is highly undifferentiated in terms of the services provided by each individual firm in the industry. Real estate agents' ability to serve clients is often limited by the availability of time as all the processes are done by humans and information is manually pulled from different resources. Technology has only been used to replace old means of communication, such as emails replacing phone calls, and electronic documents replacing printed flyers and papers.

F. Availability of Market Data

The purchase of a home is frequently the largest investment anyone makes in his/her life. However, the availability of market trends and data to individual home buyers is very limited. The publicly available data that currently exists is primarily found in local newspapers. This limited set of data is frequently not available all the time. The market information that is useful for home buyers includes housing availability, housing price movements in local, state-wide, regional and national levels, housing price movements for particular kinds of properties of certain sizes and types, interest rates of different types of loans, interest rates trends and changes over time, income levels of different local and regional areas, population movements, etc. All these data together may help potential buyers decide when, where and what to purchase. A lot of this market information is accessible to real estate agents through the PID databases and other county recordation resources. However, it is difficult as well as very time consuming for these agents to identify and gather the data, and thus the information is practically not available to the agents or the buyers.

G. Non-Intuitive Computer Search Techniques

Existing computer software programs and Internet websites allow users to enter search criteria by selecting different attributes that are available. Users currently select these attributes by such methods as selecting from drop-down boxes, clicking on radio buttons for alternative selections, checking boxes for different values, etc. However, these ways of searching make users unnecessarily go through many menus of options and attributes to enter their selection criteria. These structured search options do not provide an intuitive way for users to think about the kind of real estate properties that the users are really looking for.

SUMMARY

The invention relates, in an embodiment, to a computer-implemented method for manipulating real property data for a plurality of properties. The computer-implemented method includes identifying boundary specifications for clustering the plurality of properties, thereby forming a plurality of basic data blocks. Each of the plurality of data blocks corresponds to a subset of the plurality of properties and has boundaries delineated in accordance with the boundary specifications. The computer-implemented method also includes identifying a common attribute among properties in each of the plurality of basic data blocks. The computer-implemented method further includes representing each of the plurality of basic data blocks with a respective attribute value associated with the common attribute. The computer-implemented method yet also includes assigning attribute values of the plurality of basic data blocks with visual representations of a visual representation scale, thereby representing the plurality of basic data blocks as non-opaque visual overlays.

In another embodiment, the invention relates to a computer-implemented method for generating in advance data pertaining to a display representing real property data. The computer-implemented method includes predicting search criteria for searching through a property database. The computer-implemented method also includes performing a search through the property database using the search criteria, thereby obtaining resultant properties. The computer-implemented method further includes identifying boundary specifications for clustering a plurality of properties, thereby forming a plurality of basic data blocks. Each of the plurality of data blocks corresponds to a subset of the plurality of properties and has boundaries delineated in accordance with the boundary specifications. The computer-implemented method, in addition, includes identifying a common attribute among properties in each of the plurality of basic data blocks. The computer-implemented method moreover includes representing each of the plurality of basic data blocks with a respective attribute value associated with the common attribute. The computer-implemented method yet also includes assigning attribute values of the plurality of basic data blocks with visual representations of a visual representation scale, thereby representing the plurality of basic data blocks as non-opaque visual overlays. The computer-implemented method yet further includes storing the resultant properties and one of the non-opaque visual overlays and a processed overlay that is created by performing image processing on the non-opaque visual overlays to facilitate rapid generation of the display representing real property data if a user subsequently employs the search criteria to search for properties.

In yet another embodiment, the invention relates to a computer-implemented method for generating in advance data pertaining to a display representing real property data. The computer-implemented method includes identifying boundary specifications for clustering a plurality of properties, thereby forming a plurality of basic data blocks. Each of the plurality of data blocks corresponds to a subset of the plurality of properties and has boundaries delineated in accordance with the boundary specifications. The computer-implemented method also includes identifying a common attribute among properties in each of the plurality of basic data blocks. The computer-implemented method further includes representing each of the plurality of basic data blocks with a respective attribute value associated with the common attribute. The computer-implemented method moreover includes assigning attribute values of the plurality of basic data blocks with visual representations of a visual representation scale, thereby representing the plurality of basic data blocks as non-opaque visual overlays. The computer-implemented method yet also includes storing one of the non-opaque visual overlays and a processed overlay that is created by performing image processing on the non-opaque visual overlays to facilitate rapid generation of the display representing real property data in response to a subsequent search by a user.

These and other features of the present invention will be described in more detail below in the detailed description of the invention and in conjunction with the following figures.

DESCRIPTION OF THE DRAWINGS

The invention is described with reference to the following figures.

FIGS. 6A-D are zoom-in views of FIGS. 5A-5D.

DETAILED DESCRIPTION

The present invention will now be described in detail with reference to various embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

Figure 1:
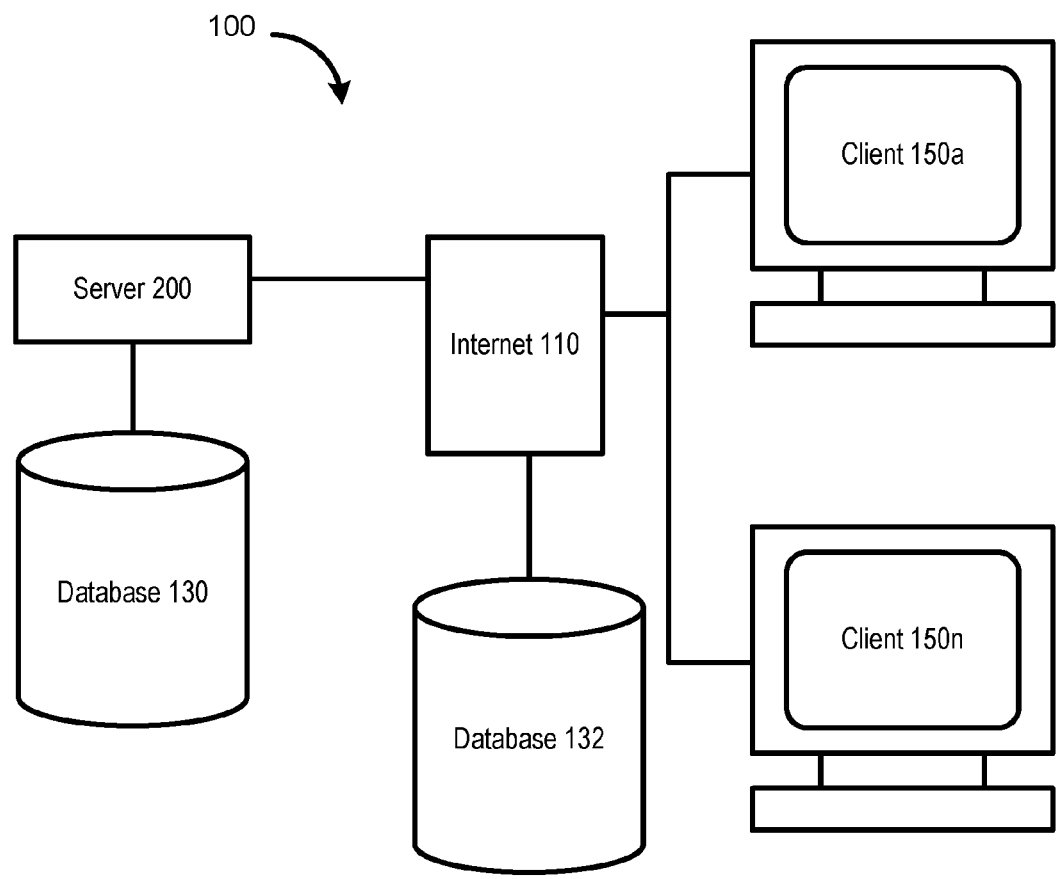
FIG. 1 depicts a client-server architecture according to an embodiment of the invention.

FIG. 1 depicts a client-server architecture 100 according to an embodiment of the invention. The internet is included shown as reference 110 that serves as a means for carrying the communication between the clients 150a-n and a server 200, and as a means for server 200 to communicate with remote databases 132. One of these remote databases 132 is a PID. While the invention may include the ability for server 200 to connect with a local database 130, connecting with one or more remote databases 132 is useful since it permits the invention to retrieve remote data and complete property records information that might otherwise require manual entry or other more complex compilation. As a result, the invention may be employed by any user who has access to the internet irrespective of geographic location to review the processed real estate data in a highly efficient manner.

Figure 2:
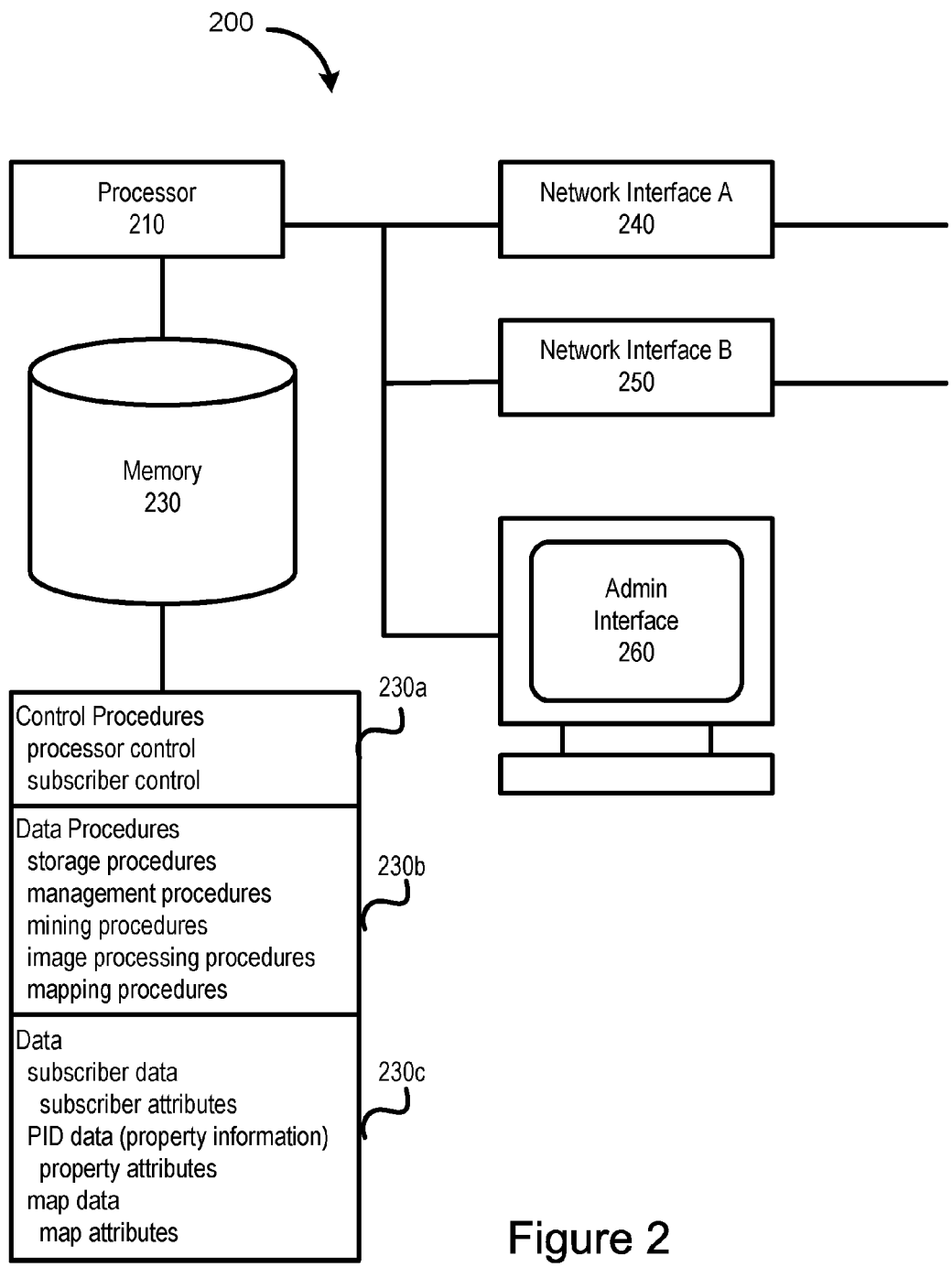
FIG. 2 depicts a server computer according to an embodiment of the invention.

FIG. 2 depicts server 200 according to an embodiment of the invention. A processor 210 is coupled to a memory 230 that includes control procedures 230a, data procedures 230b, and data 230c (local database 130 of FIG. 1). The server may have one or more network interfaces 240 and 250 for communicating with other computers over the internet, for example. An administrative interface 260 is provided for managing server 200.

The control procedures 230a represent, for example, an application program that manages the processor resources and subscriber or user access.

The data procedures 230b represent, for example, specific software for the management and processing of data. This includes, for example, techniques for retrieving data from local and/or remote databases, for mining the data, and for processing the data according to techniques described in greater detail herein.

The data 230c represents information used by the control procedures and data procedures, for example, subscriber data for user access control. The data 230c also includes attributes for each of the data elements listed in data 230c. For example, subscriber data (shown in data 230c) may include a username and password, which are considered attributes for that subscriber data element. Likewise, PID data (property information) may include a location, number of bedrooms, number of bathrooms and other features considered attributes for that property.

Figure 3A:
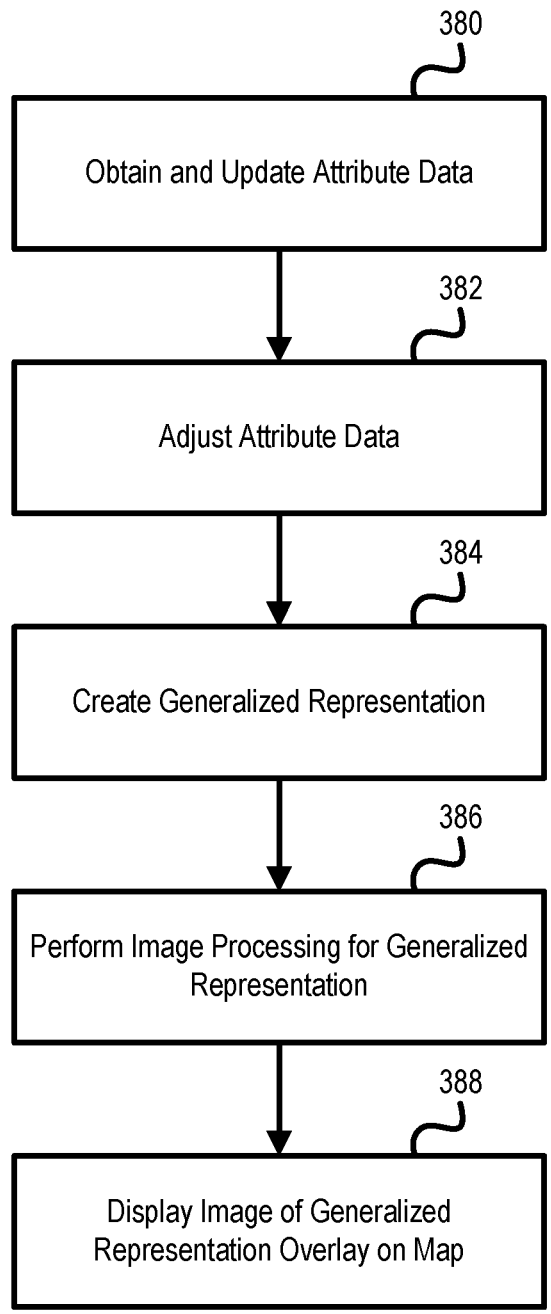
FIG. 3A shows, in accordance with an embodiment of the invention, a flow chart for obtaining, processing, and providing real estate data.

A. Overall Strategy for Obtaining, Processing, and Providing Real-Estate Data in Accordance with an Embodiment FIG. 3A shows, in accordance with an embodiment of the invention, a flow chart for obtaining, processing, and providing real estate data.

In step 380, attributes pertaining to the properties that fit the user-specified criteria and surrounding properties/neighborhoods are obtained from various data sources and updated. This step 380 will be discussed later herein.

In step 382, the attribute data for the properties obtained in step 380 is adjusted for age, using both age-adjustment (e.g., to account for market changes or inflation/deflation) and age weighting (to account for relevancy based on how recent the attribute data for the properties is, for example). This step 382 will also be discussed later herein.

In step 384, the attribute data adjusted in step 382 is employed to create generalized representation. For example, boundaries that cluster multiple properties may be identified (based on zip codes, for example) and common attributes may be identified within the clusters of properties. For example, a common attribute may represent the median post-adjustment selling price. Thus, after step 384, the generalized representation data (e.g., the aforementioned median post-adjustment selling price) for property clusters is identified, along with boundaries of the clusters (e.g., the zip code boundary using the zip code example). This step 384 will be discussed later herein.

In step 386, image processing is performed on the generalized representation data for the property clusters. This image processing may include, for example, assigning different attribute values to different colors. In an embodiment, a color scale may be assigned to the median post-adjustment selling prices of the various property clusters, with the lightest color of the color scale representing the least expensive cluster and the darkest color representing the most expensive cluster. This optional color scaling (to scale the color to reflect the value of an attribute) is advantageous in that when the color scale is displayed (showing the colors and the corresponding attribute values) the viewer may consult the color scale and determine the value of the attribute that is being displayed.

Image processing may also include smoothing and/or filtering to render the data, when displayed in a visual format, more readily understandable to the viewer. Once the color is assigned, the cluster, which is disposed within the boundary, may be represented by a bounded area having a single color or a composite smoothed color. This bounded and colored area may then be overlaid on a geographic map that shows both the general features of a city and the properties that fit the buyer's criteria. Thus, if the buyer had specified as her search criteria that she is interested in homes between 2,000 square feet and 2,300 square feet, the display shows not only the map of the city with the locations of the properties that fit this criteria (e.g., between 2,000 square feet and 2,300 square feet)

thereon but also the overlaid bounded colored areas so the buyer may appreciate the affluence of the neighborhoods (based on the median post-adjustment selling price) in which these properties are disposed.

With respect to the color smoothing and filtering, if an area of the city has 20 clusters (or basic data blocks) and 15 of which are red (representing for example median post-adjustment selling price of approximately $1 million dollars) and 5 of which are light pink (representing for example median post-adjustment selling price of approximately $800,000 dollars) interspersed throughout among the red, the area may be smoothed to a dark pink. The viewer may then consult the color scale provided and determine that such area of the city has homes predominantly in the $950,000 median range.

Multiple overlaying layers may be provided for any given map displayed to allow the buyer to relate the target properties to various generalized attributes for the property clusters (e.g., overlaying crime statistics, overlaying median education level, overlaying number of households that are unmarried, etc.). In fact, an overlay may be employed to represent any generalized attribute as desired.

In step 388, the aforementioned displaying takes place, combining the generic map (such as a geographic map), the properties that fit the specified search criteria, and the overlaid colored areas. In an embodiment, the generic map may represent a commercially available geographic map. In another embodiment, the generic map may represent a commercially available base map that has been manipulated to remove certain features (e.g., parks or highways) or to add certain features that may be deemed to clarify the information presented in the map. In another embodiment, the overlay may represent a processed graphical overlay that has been manipulated to remove certain features (e.g., parks or highways) or to add certain features that may be deemed to clarify the information presented in the map. The removed features represent features that are deemed irrelevant to the purpose of the search conducted on behalf of the viewer. For example, if the viewer is searching for properties to buy based on prices, details such as parks or highways are not directly relevant and may be omitted from the calculated and represented graphical overlay or map. In an embodiment, the user may be given an option to add back features that have been omitted if the user deems these details to be important.

B. Obtaining and Updating Real Property Attributes for Properties and Neighborhoods from Various Data Sources The PID attributes may be referred to by a number of different names. For example, the pieces of information that are to be generated and/or acquired for each property may include one or more of the following:
1. Data from PID database:
   1.1. School districts
   1.2. Areas that belong to a particular school
   1.3. Real estate sub-area boundaries
   1.4. Age of properties
   1.5. Types of properties (e.g., single family residence (SFR) vs. townhouses vs. condos)
   1.6. Price ranges of properties
   1.7. New property development areas
   1.8. Architectural styles of properties
   1.9. Square footage of properties
   1.10. Lot sizes of properties
   1.11. City boundaries
   1.12. County boundaries
   1.13. Number of property transactions within cities and counties
   1.14. Price per square feet
   1.15. Price change of listing properties
2. Data collected from Census-based demographics data
   2.1. Demographics (e.g., age, race, educational level, income, marital status, number of children, etc.) of parents
   2.2. Crime statistics
3. Information from other data sources
   3.1. Political party affiliation
   3.2. Sex offenders
   3.3. City boundaries
   3.4. County boundaries
   3.5. Climates of areas
   3.6. School district
   3.7. Areas that belong to a particular school
4. Website generated data
   4.1 Property viewing information
   4.2 Users' web usage log
   4.3 Information actively collected from website users about a property.
5. Manually obtained data that is manually entered by human operators. For example, a real estate agent may notice information via reading newspaper that may impact one or more pieces of property and may wish to include that data as an attribute of the impacted properties.

The PID attribute data is initially retrieved from a database such as the PID database to generate a baseline data set for each of the properties. At this point, the PID attribute data is considered baseline since such PID attribute data has not been supplemented with information from other data sources.

As noted above, the PID and other databases are often incomplete and may not include certain fields and/or data values that are useful to consumers of real estate information. For example, school district information may change and certainly the student test scores change from year to year. However, PID may contain school district information from historical sale transaction that happened 10 years ago, which does not reflect the changes that have occurred since the transaction took place. Accordingly, relying on PID data alone may result in skewed results since the PID data is outdated. To solve this problem, the invention supplements the PID and other databases with data sources deemed to have more up-to-date information and updates any outdated information to provide the most accurate aggregate data possible.

Figure 4A:
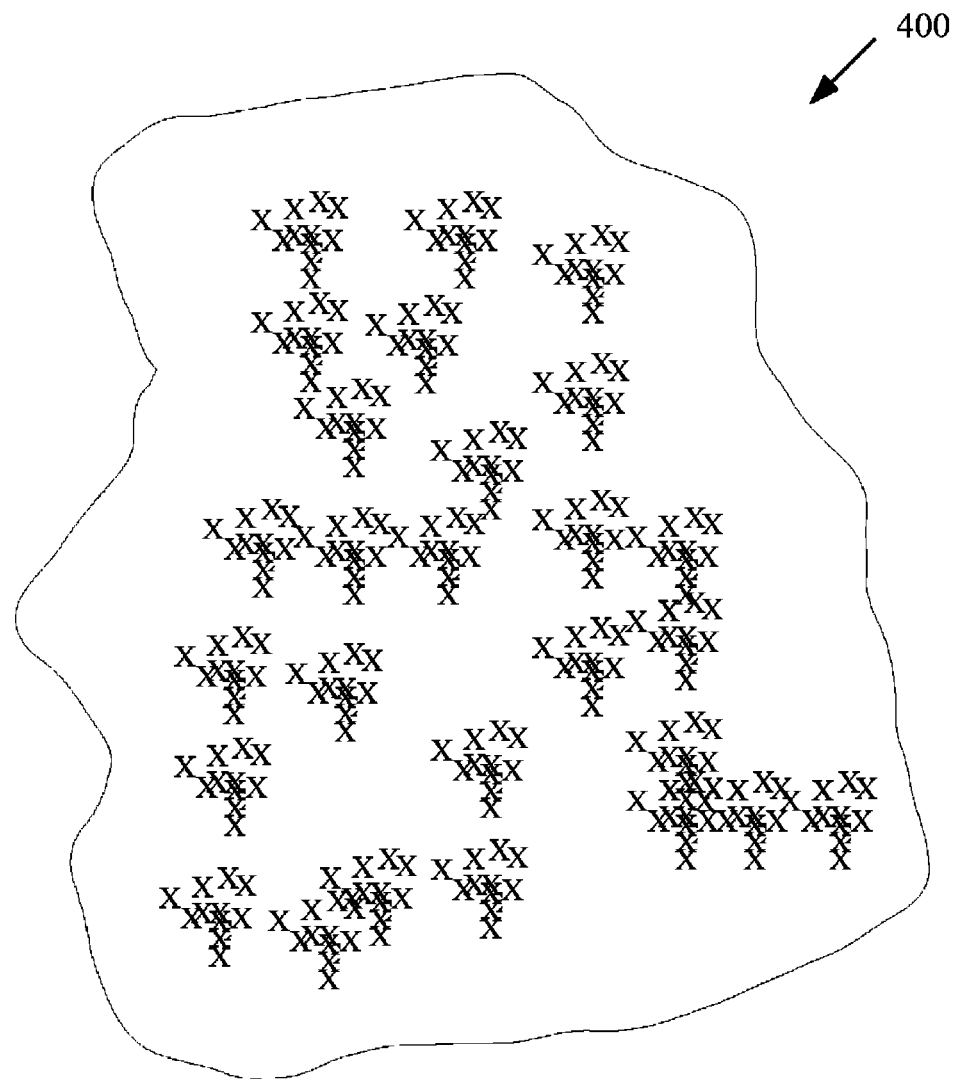
FIGS. 4A-B are exemplary map images depicting processed attribute value data for basic data blocks according to embodiments of the invention.

With reference to FIG. 4A, for example, the X's mark homes in a region 400 that have been sold and for which PID sales data is available. This is just the first step. The next step is to collect additional data from other data sources that may pertain to the homes represented by the X's in FIG. 4A in order to aggregate and update the attribute data for these homes. Further, attributes common to multiple homes and/or neighborhood (e.g., crime statistics) may also be updated using a variety of data sources.

C. One Embodiment of a Process of Creating Representation Data of Real Estate-Related Information The invention includes techniques for compiling and processing real estate data. Exemplary embodiments are provided to describe various techniques, but the invention is not limited solely to these explicitly discussed techniques since the invention may also work with other techniques that may be known to those skilled in the art given this disclosure.

In one embodiment, an exemplary process of creating a representation of real estate-related information includes the following steps.
1. Identify specific pieces of data that are important to real estate transactions.
2. Identify sources of relevant data that may be used to generate interested data.
3. Identify format from the original data source, or directly use data from external databases
4. Set up new database with format of the after-transformed data
5. Age-adjust data to make the data current to today's values, such as projecting today's market price of a particular home based on a home sale price from 5 years ago
6. Define transformation algorithm to be used to transform data from original data source and format into wanted after-transformed data format
7. Implement transformation algorithm with a system
8. Detect boundaries of natural areas, and use special filtering processing depending on the location of whether it is on the boundaries
9. Routinely execute import from data source and transformation
10. Routinely improve and update transformation algorithms.

As the term is employed herein, a representation of real estate-related information refers to the resultant representation of the previously disparate pieces of data pertaining to a property or a neighborhood, which disparate pieces may have been disposed in different databases with varying degree of accuracy in the prior art. The representation of real estate-related information is obtained not only by aggregating attribute information from various data sources but also by performing transformation on the aggregated attribute information from various data sources to extract characteristics that were not previously present in the aggregated attribute information. For example, a buyer may specify parameters or criteria describing her desired property (e.g., in a particular general location, within a certain price range and square footage). Aggregating the attribute data may provide the buyer with up-to-date and a rich source of information regarding the properties that match the buyer-specified criteria. However, the representation of real estate-related information obtained using embodiments of the invention may reveal that comparable sales occur in three different nearby neighborhoods or basic data blocks, which may suggest to the buyer that these nearby neighborhoods or basic data blocks may represent a suitable locations for searching for her desired property.

Figure 3B:
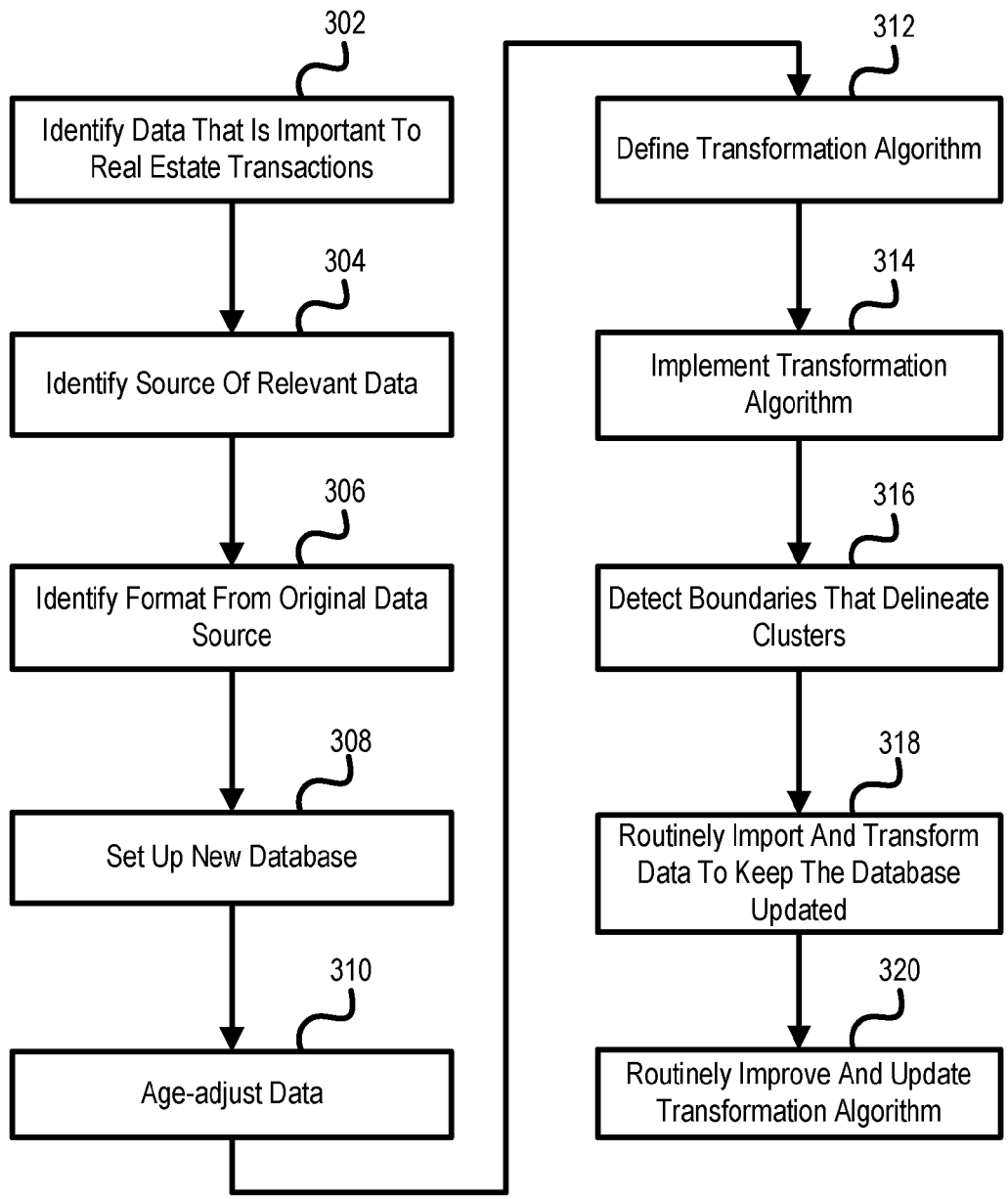
FIG. 3B shows, in an embodiment of the invention, an exemplary process for creating a representation of real estate-related information.

To further elaborate, FIG. 3B shows, in an embodiment of the invention, an exemplary process for creating a representation of real estate-related information.

In step 302, the method may identify specific pieces of data that are important to real estate transactions. For example, selling price may be a criterion that is important to a buyer.

In step 304, the method may identify sources of relevant data that may be used to generate interested data. For example, the selling price may be obtained from the PID, the local newspaper archive, and title records.

In step 306, the method may identify format from the original data source, or directly use data from external databases. For example, some data sources may store its data using relational databases while others may exist as computer readable alphanumeric or comma-delimited files. Yet, others may exist as human readable data that may need to be entered.

In step 308, the method may set up the appropriate data structure within the database with format of the after-transformer data to store the data aggregated from the various sources.

In step 310, the method may perform age adjustment to the data to make the data current to today's values, such as projecting today's market price of a particular home based on a home sale price from 5 years ago.

In step 312, the method may define a transformation algorithm to be used to transform data from original data source and format into the desired after-transformed data format. For example, a function or a table may be provided to transform the data obtained from the original data source and having the original data format to the desired after-transformed data format.

In step 314, the method may implement the transformation algorithm with an appropriate computing system to perform the data acquisition and manipulation.

In step 316, the method may detect boundaries of areas that delineate clusters (using for example school district boundaries, zip codes, custom-created boundaries, etc.). Further, the method may employ filtering processing to smooth out the generalized representation in a given area (which may include one or more clusters or basic data blocks).

In step 318, the method may routinely import from the various data sources and perform transformation to keep the database updated with the latest transaction data.

In step 320, the method may routinely improve and update transformation algorithms to improve the accuracy with which data may be acquired from the various data sources.

D. Example

As described above, the invention includes techniques for compiling and processing real estate data. Exemplary embodiments are provided to describe various techniques, but the invention is not limited solely to these techniques since techniques may also be employed in view of this disclosure.

Figure 3C:
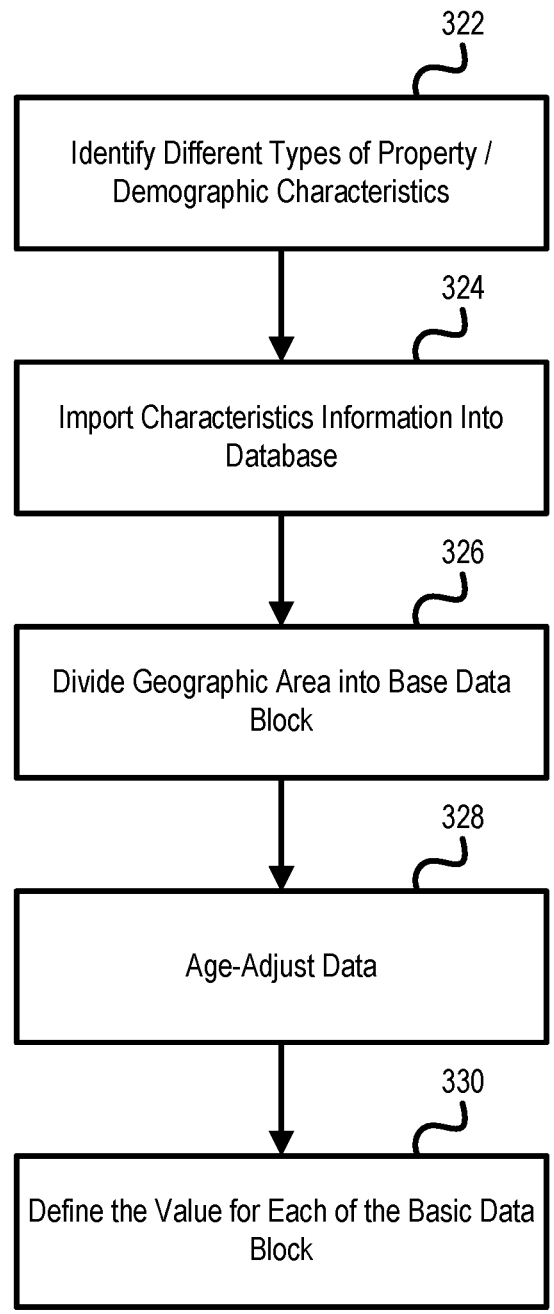
FIG. 3C shows, in an embodiment, a method for transforming data into generalized real estate neighborhood data.

FIG. 3C, in one embodiment, a method of transforming data into generalized real estate neighborhood data includes the following steps.
1. Property characteristics information
  1.1. In step 322, different kinds of property/demographic characteristics may be identified in the PID, or other databases. For instance, a property at 960 College Ave., Palo Alto, Calif. is listed for sale. The property/demographic characteristics include, but are not limit to the following items: zip code (94306), city name (Palo Alto), number of bedroom (2), number of bathroom (2), listing price ($839,000), square footage (772), lots size (1200), year of built (1964).
  1.2. In step 324, the information pertaining to properties may be imported into a database for use by embodiments of the invention, or may be used directly from external database(s).
  1.3. In step 326, take any geographic area, and divide the area into basic data blocks, by one of the following methods:
    1.3.1. dividing the area uniformly by rectangles based on the longitudes and latitudes; or
    1.3.2. dividing the area by sub-regions that are established by real estate groups, such as real estate sub-areas (many sub-areas that are defined within one city). For instance, there are totally 12 sub-areas in the city of Palo Alto. The 960 College Avenue property belongs to the sub-areas called "Stanford", for example; or 1.3.3. dividing the area by sub-areas that are established by established location boundaries, as defined by the U.S. Postal Service or other agencies, such as school district, zip codes and cities. For instance, the previous property's zip code is 94306. It belongs to the city of Palo Alto and the school district of "Palo Alto Unified"; or 1.3.4. dividing the area by sub-areas that are established by other organizations, such as areas separated by certain roadways, streets, railway tracks, transportation zones (as defined by certain transportation agencies such as subway companies), and the likes. For instance, a Caltrain scheme (Caltrain is a subway system located in, among others, San Mateo and Santa Clara county) to categorize the sub-region for the previous property, such property belongs to zone 3 for example and the closest subway station is "California Avenue".

1.4. In step 328, age-adjust all the data 1.4.1. particular pieces of data change over time, such as the price of a property. In order for this system to compare all data points that are collected over a long time, the data points need to be age-adjusted, such that those data points are brought up-to-date to a particular reference time, often the current time. For instance, the previous property is listed as $839,000. Since it is an active listing, this price data is up-to-date. There is another property at 962 College Ave., Palo Alto, Calif. Currently this property is not listed for sale. According to the transaction history, the previous transfer for this property took place in September 2001. The transfer value was $800,000. This property's value is estimated as $1,400,000 after the previously transfer value (e.g., $800,000 is converted to the current value).

1.4.2. The data may be age-weighted as well. Since the more recent data may be deemed more important than data points that were taken a long time ago, the age of the data point collected may be used to generate a weighting of the data. For instance, consider the two data points mentioned in the previous example. The first one has the age of 0. The second one has the age of 5 years. The age-weighted factors for these two properties may be 10 and 6, respectively, to indicate their relevance and importance.

1.5. In step 330, define the value for each of the basic data blocks, by one of the following methods:

1.5.1. Simple average 1.5.1.1. Take each basic data block 1.5.1.2. For each basic data block, find all properties from various data sources that are geographically located within this basic data block. For instance, a basic data block is defined within the city of Palo Alto. This basic data block contains all the properties between College Avenue and Page Mill Road (north-south orientation), Hanover Street and Yale Street (west-east orientation).

1.5.1.3. Find the intrinsic data/information for each of these properties from the various data sources and update if necessary.

1.5.1.4. Take the simple arithmetic mean, median or modal value of all the property values from 1.5.1.3, and generate the transformed block value. For instance, there are totally 86 properties in the block defined in 1.5.1.2. The median price is $1,400,000, which is the transformed block value or generalized representation of the block.

1.5.1.5. For the basic data blocks that do not have any values from the data sources, this transformed block value is calculated by taking the same simple arithmetic mean, median or modal value of the transformed block values of neighboring basic data blocks. This process may be repeated to fill in all basic data blocks without intrinsic data values that may be obtained from the various data sources.

1.5.2. Median Convolution Filter. The convolution filter is used to enhance the image details. Specifically, if we simply display the transformed block value, the entire map may have the appearance of "mosaic". The convolution filter is able to smooth the color transformation among different block. 1.5.2, 1.5.3. and 1.5.4 below are three mathematically different approaches, which address same image enhancement objective.

R. Bock and W. Krischer, "*The Data Analysis Brief-Book*", Springer, 1998.

1.5.3. Gaussian Convolution Filter

R. Bock and W. Krischer, "*The Data Analysis Brief-Book*", Springer, 1998.

1.5.4. Mean Convolution Filter

R. Bock and W. Krischer, "*The Data Analysis Brief-Book*", Springer, 1998.

E. Another Embodiment of the Process in Generalizing the Real Estate Data

Method Steps

The invention comprises one or more of the following phases and/or steps. The examples listed are not exhaustive and are included for demonstrative purposes only.

A stand-alone application may be created for data aggregation, attribute processing, image generation, and image processing. This application allow one to vary the following attributes of the data: latitude/longitude resolution, contour levels, contour colors, minimum/maximum value thresholds, filter types, filter size, zoom level, number of tiles per map, map boundaries and size, data source, included cities, and property type or status in order to facilitate viewing real-property data in the most understandable and/or insightful manner.

Figure 3D:
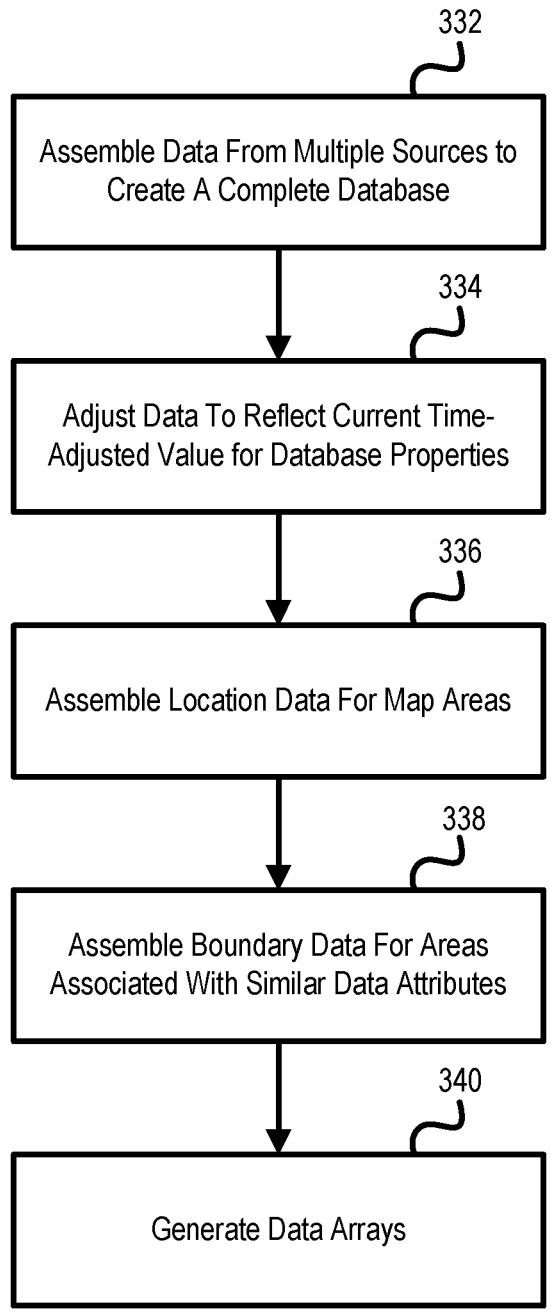
FIG. 3D is a flowchart showing a method of performing data processing according to an embodiment of the invention.

Stage 1: Data Processing (FIG. 3D)

Step 332: Assemble from multiple data sources the following example property-related information: Listing Price, Sale Price, Age, Square Feet, Lot Size, Bedrooms, Bathrooms, Zip Code, City, County, School District, School Area, Real Estate District, Zoning Type, Property Type, Resident Demographics (e.g., age, race, educational level, income, marital status, number of children, etc.), Political Affiliation, Census Data, Weather, Architectural Style, Crime Statistics, Sex Offender Locations, and the likes.

Step 334: Adjust outdated data to reflect current time-adjusted value (boundary changes, pricing fluctuations, zoning changes, etc.). For instance, the property at 962 College Ave., Palo Alto, Calif. used to belong to the school district named "Palo Alto Unified" five years ago. In 2005, the school agency changed the boundary of school district for San Mateo County. Consequently, this property now belongs to the school district named "Sequoia Union High". The outdated school district data is adjusted accordingly.

Step 336: Assemble location data for map areas (highways, commercial zones, parks, waterways) that should not be plotted on the graphical overlay. For instance, a property at 311 Sheridan Drive, Menlo Park, Calif. is surrounded by Bayshore Freeway and Flood County Park. Both the park and the freeway covered physical area on the overlay should not be plotted, in an example, since the inclusion of such details on the overlay display may simply confuse the viewer without adding much to the understanding of the target property. However, if the relative distance to freeways and/or parks is an important consideration to the user, the information about these locations may be left in. Thus, the level of details may be varied as desired.

Step 338: Assemble boundary data for areas (zip code, city, county, school district) associated with a uniform data value. For instance, all the properties with the zip code of 94306 in the city of Palo Alto are categorized into one data cluster.

Step 340: The output of phase one may be, for example, one or more two-dimensional arrays of data values. This output provides the input to the algorithms of phase two. For instance in one embodiment, assuming each basic data block represents a city, a two-dimensional array may represent the names of cities and the median property price for the properties within each city. In another embodiment, if each basic data block represents a zip code area, the output two-dimensional array may represent the zip codes (e.g., 95041 or 95041-1223) and the median property price for properties within each zip code.

Figure 3E:
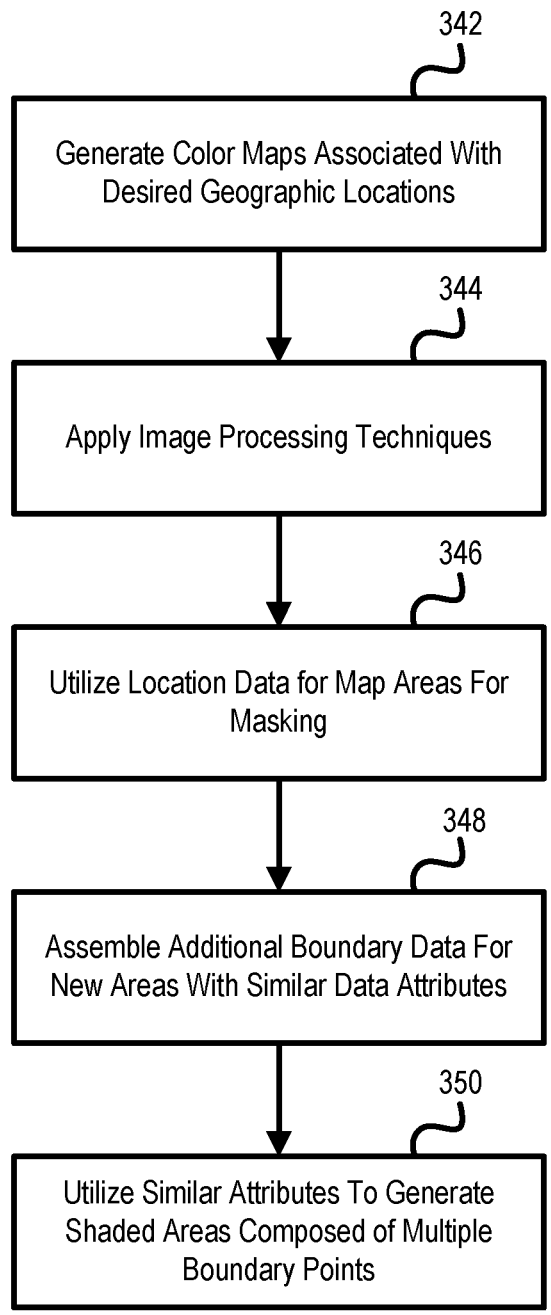
FIG. 3E is a flowchart showing a method of performing image processing according to an embodiment of the invention.

Stage 2. Image Processing (FIG. 3E)

Step 342: Generate colored maps that associate geographic location with the desired data value. For instance, if the previous array is used, the map may be colored by cities.

Step 344: Apply the following smoothing and edge detection techniques to optimize image quality. Following the previous example, the color at the city boundaries is updated so that the color change is smooth.

Smoothing

Mean and Median Filter:

R. Boyle and R. Thomas, "*Computer Vision: A First Course*", Blackwell Scientific Publications, 1988, pp 32-34.

E. Davies, "*Machine Vision: Theory, Algorithms and Practicalities*", Academic Press, 1990, Chap. 3.

D. Vernon, "*Machine Vision*", Prentice-Hall, 1991, Chap. 4.

Thresholding-Based Median

J. Canny, "*A Computational Approach to Edge Detection*", IEEE Transactions on Pattern Analysis and Machine Intelligence, November 1986, Vol. 8, No. 6.

Gaussian Smoothing:

E. Davies, "*Machine Vision: Theory, Algorithms and Practicalities*", Academic Press, 1990, pp 42-44.

R. Gonzalez and R. Woods, "*Digital Image Processing*", Addison-Wesley Publishing Company, 1992, p 191.

R. Haralick and L. Shapiro, "*Computer and Robot Vision*", Addison-Wesley Publishing Company, 1992, Vol. 1, Chap 7.

B. Horn, "*Robot Vision*", MIT Press, 1986, Chap 8.

D. Vernon, "*Machine Vision*", Prentice-Hall, 1991, pp 59-61, 214.

LaPlacian-Based Gaussian Filter:

R. Haralick and L. Shapiro, "*Computer and Robot Vision*", Addison-Wesley Publishing Company, 1992, Vol. 1, pp 346-351.

B. Horn, "*Robot Vision*", MIT Press, 1986, Chap 8.

D. Marr, "*Vision*", WH Freeman and Company, 1982, Chap 2, pp 54-78.

D. Vernon, "*Machine Vision*", Prentice-Hall, 1991, pp 98-99, 214.

Edge Detection

Contour Recognition:

P. Bourke, "*A contouring subroutine*", BYTE archive, 1987, Vol. 12, No. 6, pp 143-150.

Gradient Filter and Canny Filter:

J. Canny, "*A Computational Approach to Edge Detection*", IEEE Transactions on Pattern Analysis and Machine Intelligence, November 1986, Vol. 8, No. 6, pp 679-698.

R. Boyle and R. Thomas. "*Computer Vision: A First Course*", Blackwell Scientific Publications, 1988, p 52.

E. Davies, "*Machine Vision: Theory, Algorithms and Practicalities*", Academic Press, 1990, Chap 5.

R. Gonzalez and R. Woods, "*Digital Image Processing*", Addison-Wesley Publishing Company, 1992, Chap 4.

Step 346: Utilize location data for map areas that should not be plotted on the map (as described in step 336) as a mask to generate colorless areas. For instance, the park and freeway mentioned in step 306 are masked.

Step 348: Assemble additional boundary data for new areas with a uniform data value after application of smoothing and edge detection techniques.

Step 350: Utilize boundary data for all areas associated with a uniform data value to generate shaded areas composed of multiple boundary points. For example, the data is filtered using a filter so that different geographical areas demonstrate different characteristics. One aspect of the filter uses polygon plotting techniques to shade area with one or more polygons. For example, in one embodiment, the city of Palo Alto has 100 basic data blocks. Originally, there are 100 "mosaic" or basic building blocks on the color map. After the image processing step, filtering yields two main characteristics, identified as housing prices, for basic data blocks in the city of Palo Alto. The north area of Palo Alto is shaded red, which indicates the house price is approximately $1.5M. The south area of Palo Alto is shaded yellow, which indicates the house price is $1M. Based on the color map, two new areas are identified for the city of Palo Alto. The algorithm may assemble the boundary information for each "composite area," which is formed from a plurality of basic data blocks. Within each new area, the house price has been smoothed and unified. Additional aspects of the filter are described in detail below.

Figure 3F:
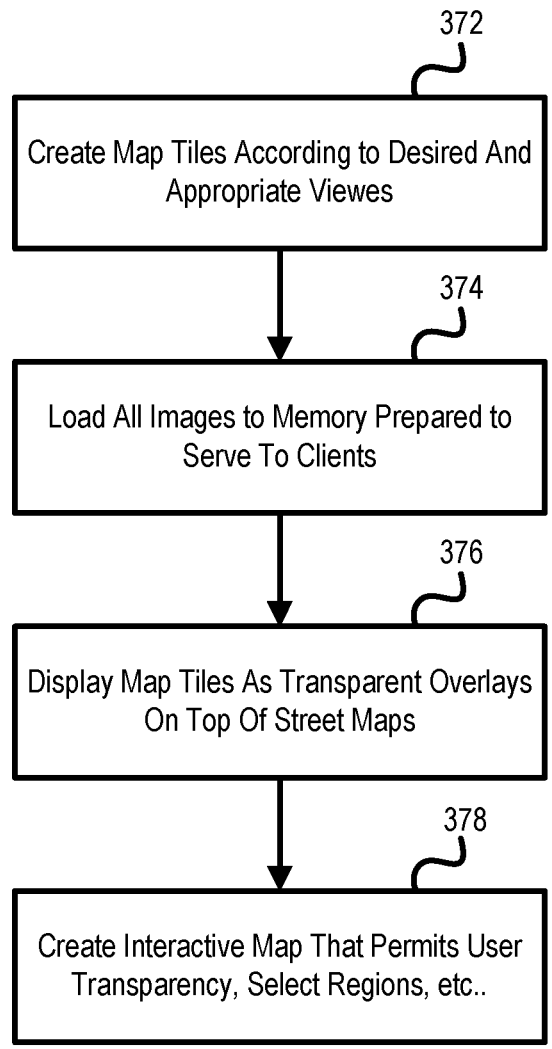
FIG. 3F is a flowchart showing a method of performing image delivery according to an embodiment of the invention.

F. One Embodiment of Graphical Image Display Delivery (FIG. 3F)

Step 372: Create map tiles according to appropriate zoom level, latitude/longitude coordinates, and map size (e.g., TileCutter.js). This step utilizes image processing software and base map data, such as those available from geographic mapping companies. These map tiles represent maps that are characteristic of a specific zoom level, latitude/longitude coordinates, and map size, for example. Google Maps, available from Google, Inc. of Mountain View, Calif., may be employed although there exist other applicable vendors (e.g., MapQuest, Yahoo, de Carta, etc.) with suitable mapping software and base map data as well.

Step 374: In one embodiment, the system may load all images to memory and serve these tiles from memory for performance purposes. In another embodiment, the map tiles may be loaded from disk. In an embodiment of a mapping software to be use, the method may serve files according to the file naming and file directory conventions of Google Maps (e.g., index.php).

Step 376: Create display using transparent overlays on top of street maps, satellite maps, or other maps of the corresponding region. Utilize in one embodiment, for example, Google Map Extensions such as GxMarker, TPhoto, TLabel, and)(Polygon to display data values and boundary data.

Step 378: In one embodiment, create an interactive map that allows the user to vary transparency of the overlay(s), select regions, zoom, scroll, and vary the data being displayed.

G. Integrated Graphical Display of Generalized Real Estate Neighborhood Data with Property Searches Generally speaking, at least two modes of uses of the graphical visualization of real estate data are provided.

1. To browse different areas of a region to search for a suitable area for general housing search
   1.1. Users are interested in real estate properties in a specific region, such as the San Francisco Bay Area.
   1.2. Users identify and define certain search criteria, based on prioritized user search criteria based on many criteria, including but not limited to number of bedrooms, number of bathrooms, price range, areas, architectural styles, kitchen amenities, living and dining room layouts, age of the house, size of the house, property lot size, availability of a pool, etc.
   1.3. List of properties, in one embodiment, are shown on a geographical representation of location, such as a map, that matches the search criteria. These lists of properties may also include a list of historic sale of properties as well as current listing of properties.
   1.4. In one embodiment, on top of the same map that these properties are shown, different generalized real estate neighborhood overlays may be displayed. Since these overlays contain generalized real estate neighborhood data, the "neighborhoods" are then created visually with these overlays on top of maps. The overlay may be shown as a non-opaque colored overlay (i.e., the overlay does not completely obscure or render invisible to the viewer other data or information that occupies the same display screen area as the overlay). The aforementioned post-adjustment median price is an example of an overlay. Other overlays are possible and multiple overlays may be displayed simultaneously if desired. Users may then be able to visualize the available properties (i.e., those that match the user's criteria) in relation to the generalized "neighborhoods".
   1.5. Users may be able to update and change the search criteria, and the list of properties is then updated, in relation to these generalized "neighborhoods".
   1.6. Through this process of manipulation of search criteria, users are thus able to identify certain areas within the original larger region where there is a higher concentration of the type of properties that are good match to the users' preference.
2. To survey the exact location around a property that is of interest to a user.
   2.1. User has identified a particular property of interest.
   2.2. Users may then use the visualization of generalized attribute values to help to research the characteristics of properties around that particular location.
   2.3. Users may view the various types of the generalized attribute values for these locations through the different overlays.
3. To browse different areas of a region for their generalized attributes
   3.1. Operator specifies real estate properties in a specific region, such as the San Francisco Bay Area.
   3.2. Operator identifies and defines certain search criteria, based on prioritized user search criteria based on many criteria, including but not limited to number of bedrooms, number of bathrooms, price range, areas, architectural styles, kitchen amenities, living and dining room layouts, age of the house, size of the house, property lot size, availability of a pool, etc.
   3.3. Properties are then clustered into basic data blocks using boundary specifications (e.g., zip code, school district, or latitude/longitude) and common attributes (e.g., median housing price, age range, architecture style, etc.) are specified/ascertained.
   3.4. Attribute values for the basic data blocks are then computed (e.g., by taking the median of properties within a basic data block, taking the average, or some other mathematical and/or statistical calculations).
   3.5. The basic data blocks along with their attribute values are then stored for later searching by users.
   3.6. Users can search the basic data blocks by specifying search criteria (e.g., "show me areas where houses are between 10 and 20 years old", or "show me areas where the bungalow style architecture is predominant."
   3.7. The basic data blocks are then displayed, as bounded visual representations, on a map. For example, the map may show colored or shaded areas where the houses are between 10 and 20 years old.
   3.8. Alternatively, image processing may be performed on the basic data blocks to smooth out the visual representation and render the information more easily understood by the user.

Figure 4B:
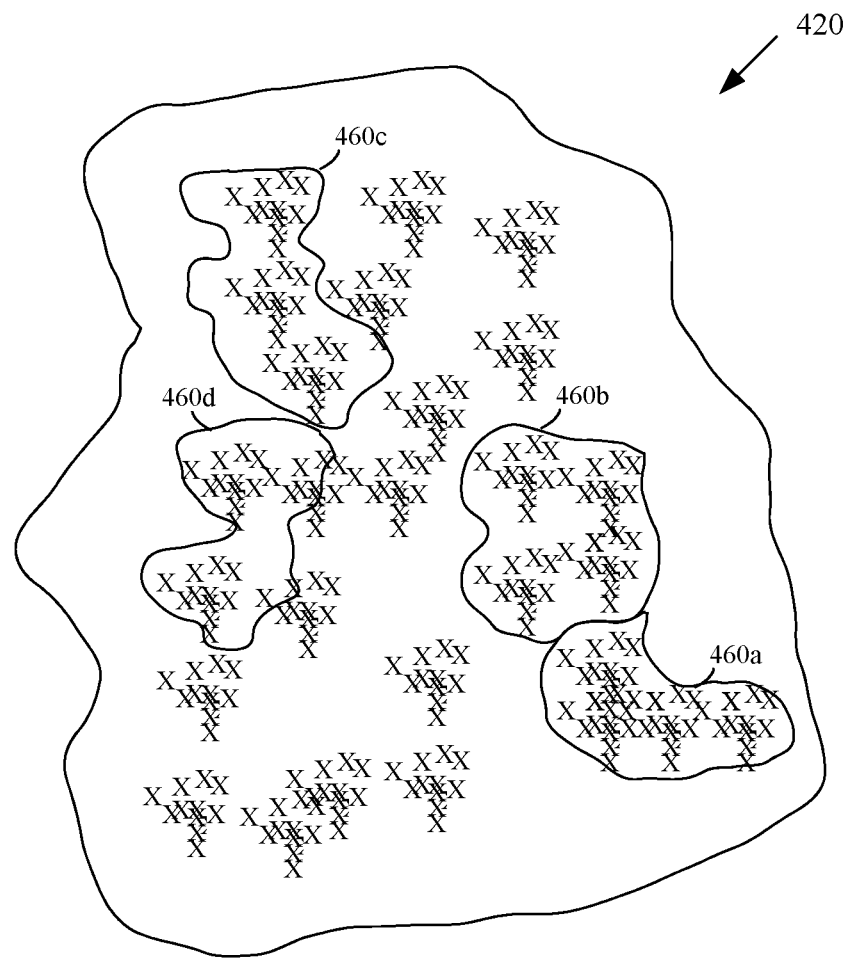

FIGS. 4A-B are exemplary map images depicting property data according to embodiments of the invention. FIG. 4A depicts raw data representing properties within a given geographical region 400, i.e., the city of Palo Alto. If a data point (marked by an "X" in FIG. 4A) is shown on certain positions of the region, it means there is a property at that position and its property information is available. The invention applies one or more filters to the raw data in order to identify locations with substantially uniform attributes according to the applied filter.

Suppose for example there exists one attribute "school district" and there are ten data points in region 400 that share the same school district. Possibly these data points, i.e. properties, belong to the same location.

FIG. 4B depicts a map 420 with locations 460*a-d* that conform to one (e.g., school district) or more (e.g., school district, time of construction) selected attributes. The locations are likely to contain properties that share the selected characteristics. Therefore, a person seeking a home having similar attributes may be interested in looking at homes in these locations. However, it is not a guarantee that every property in the location has those attributes since there are anticipated differences within the locations.

In an example of applying an age filter, the homes in location 460*a* were generally built before 1970 while the homes in location 460*b* were generally build after 1970. The invention may depict these different locations with different colors for the users to easily distinguish between the locations, for example, location 460*a* may be a light green while location 460*b* may be a light yellow. The individual properties outside the identified locations may not have attributes confirming with the selected filter. Other data depictions are anticipated with additional attributes used to filter the property data and provide a graphically depiction of the filtered data.

Figure 5A:
FIGS. 5A-D are map images depicting processed attribute value data for basic data blocks according to embodiments of the invention.
Figure 6A:

FIG. 5A is the unprocessed raw data of a certain real property attribute (such as median price). FIG. 5A will be discussed in relation to FIG. 6A, which is a zoom-in view of a section of FIG. 5A. At a high magnification level (i.e., by zooming in as shown in FIG. 6A), the many colored squares appear discrete, taking on the appearance of a mosaic of randomly distributed colored squares. At this level of display, the information is more granular. For example, a particular area may include 87 basic data blocks or squares (although the geometric shape of a basic data block does not have to be a square), 67 of which are deep red ($2M average price), 10 are pink ($1.8M), 5 are orange ($1.6M), 3 are yellow ($1M), 2 are white ($0.75M), with the pink, orange, yellow, and white distributed and/or clustered randomly among the deep red in an example). As such, the information supposed to be conveyed by the colors (e.g., median pricing) may be confusingly complex for the average viewer to comprehend.

Figure 5B:
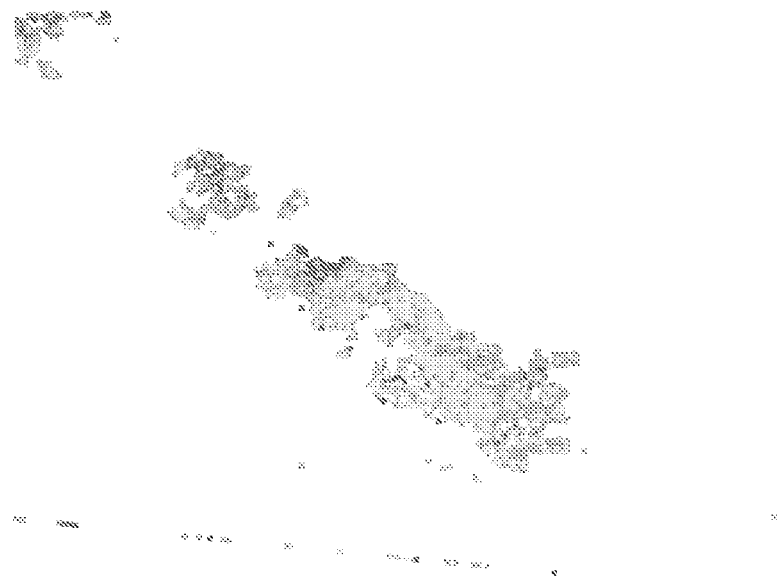
Figure 5C:
Figure 5D:
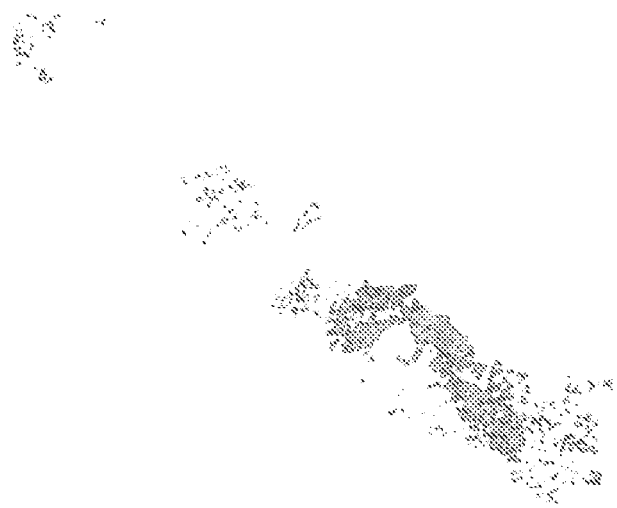
Figure 6C:
Figure 6D:

According to embodiments of the invention, various filters are used to process attribute value data. The results are shown in FIGS. 5B-5D. FIGS. 5B-5D will be discussed in relation to FIGS. 6B-6D, which are zoom-in views of sections of FIGS. 5B-5D, respectively. Filtering allows the colors of adjacent squares to be smoothed over, allowing the predominant color to show more clearly. When the user zooms into the post-filter display (as shown in FIGS. 6B-6D, respectively), continuous coloring (e.g., a light shade of red) replaces most or all of the discrete colored squares (e.g., deep red, pink, orange, yellow, white, etc.) of the pre-filter display. By consulting a provided color scale, the viewer may readily determine the value associated with the displayed unified color (e.g., light shade of red or around $1.9M average price according to the example color scale). These images of FIGS. 5A-5D and FIGS. 6A-6D show how the data may be processed using a variety of different image processing algorithms and the resulting images.

In an embodiment, a number of displays may be obtained in advance such that these displays may be immediately delivered to client computers based on understanding of search activities and users' needs. This understanding may be achieved by analyzing users' web usage log for example. For example, an analysis of users' web usage log reveals that users typically search for the number of transactions in the past month within any basic data blocks in order to evaluate how "hot" the real estate market within that basic data block.

This type of search may then be pre-calculated. A map for displaying the number of transactions is pre-generated and ready to serve clients' need. It is also possible to store a number of images that display real property neighborhoods with different price points (e.g. houses under $500K, houses between $500K-$1M, and houses over $1M) because the web usage log shows that many users perform real property search using the criteria of price range. Since price range is used as a criterion, overlays of basic data blocks based on price range may also be prepared in advance. The data for the display may be prepared in advance, including image processing, to improve performance during user searches.

Another example search criteria is time of construction (e.g., houses constructed before 1950, those constructed 1950-1990, and those constructed after 1990). These different maps may be stored and immediately served to a client for immediate display, instead of showing a map with all ranges of years of construction. In so doing, users may look at only his desirable neighborhoods within minimum response time. This approach also results in cleaner visualization of a number of generalized real estate neighborhoods that are desired by a particular user's selection criteria. For instance, the user might perform a search based on different real estate attributes, such as time of construction and property size. For the layer that shows the time of construction, the display is less cluttered since the display does not show ranges of years of construction that are not of interest to the user. The same situation applies to the layer of property size. Because both layers remove irrelevant information (e.g., year of construction and size that are not of interest to the user), it is possible to display both layers simultaneously on the same map as overlays without unduly overcrowding the display with irrelevant details.

The invention also anticipates preparing custom displays that may take some processing to render. For example, historical neighborhoods with houses that have particular attributes, e.g., colonial construction between 1950 and 1960 under $500K. These images may be processed in nearly real time.

H. Conclusion

Advantages of the invention include the ability for users to visualize real property attributes on a macro scale (e.g., neighborhood scale). This improves the ability of users to identify neighborhoods, and potentially properties therein, with desirable traits for each user.

Having disclosed exemplary embodiments and the best mode, modifications and variations may be made to the disclosed embodiments while remaining within the subject and spirit of the invention as defined by the following claims.

While this invention has been described in terms of several embodiments, there are alterations, permutations, and equivalents, which fall within the scope of this invention. For example, although colors and color scales are employed to visually illustrate the attribute values of the basic data blocks (or of the composite area comprising the unified/smoothed attribute values of multiple basic data blocks), it is possible to employ other visual representations such as shading, grey scale, or the visual representation may simply be alphanumeric or other labels (e.g., $1.2M label or "A" or a star shape or a flashing boundary or shape for a given bounded area representing a basic data block). In fact, it is contemplated that any suitable visual representation may be employed to represent the attribute value of a basic data block or of the composite area comprising multiple basic data blocks.

Also, the title, summary, and abstract are provided herein for convenience and should not be used to construe the scope of the claims herein. Further, in this application, a set of "n" refers to zero or more "n" in the set. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for analyzing real property data representing a plurality of real properties, the method comprising:
    identifying based upon user selectable search criteria, from the real property data and by a computer, at least one subset of the plurality of real properties, and further wherein each of the plurality of real properties included within the subset is within a specified boundary;
    identifying a common attribute shared among at least some of the plurality of real properties included within the subset;
    responsive to determining an age of a first attribute value associated with the common attribute, adjusting the first attribute value to account for the age;
    representing the adjusted first attribute value as a visual representation according to a visual representation scale;
    generating a geographic display, wherein the generated geographic display includes the visual representation as a non-opaque overlay on a geographic map; and
    providing the generated geographic display.

2. The method of claim 1, wherein the non-opaque overlay is superimposed on the geographic map, wherein the geographic map includes geographic information in addition to the visual representation.

3. The method of claim 1, wherein generating the geographic display further includes:
    removing, from a base map, features unrelated to a search query to obtain the geographic map.

4. The method of claim 1, wherein the specified boundary is delineated in accordance with boundary specifications.

5. The method of claim 1, further comprising:
deriving the first attribute value from a plurality of data sources.

6. The method of claim 5, wherein the plurality of data sources includes a multiple listing service and an additional data source.

7. The method of claim 6, wherein deriving the first attribute value further includes:
obtaining the first attribute value from the multiple listing service; and
further wherein adjusting the first attribute value includes updating the first attribute value according to the additional data source.

8. The method of claim 1, further comprising:
receiving the real property data from a multiple listing service.

9. The method of claim 1, wherein the geographic display includes respective visual representations for each of the plurality of real properties.

10. The method of claim 9, further comprising:
receiving first search criteria for a real property search from a user; and
performing a search query on a database according to the first search criteria, wherein first search results representing real properties are received.

11. The method of claim 10, further comprising:
including the first search results in the geographic display.

12. The method of claim 10, further comprising:
performing image processing on the non-opaque overlays included in the geographic display, wherein the image processing includes:
smoothing a first set of non-opaque overlays associated with at least two different visual representations, wherein a composite non-opaque overlay representing a composite area is generated, wherein the composite area has a composite area boundary that includes specified boundaries; and
including the composite non-opaque overlay in the geographic display.

13. The method of claim 10, wherein the first search results identify the plurality of real properties.

14. The method of claim 10, wherein the first search criteria specify boundary specifications for at least one of the plurality of real properties.

15. A non-transitory computer readable memory medium storing processor executable instructions for analyzing real property data, the instructions including instructions executable to:
identify based upon user selectable search criteria, from the real property data, at least one subset of the plurality of real properties, and further wherein each of the plurality of real properties included within the subset is within a boundary delineated in accordance with boundary specifications;
identify a common attribute shared among the plurality of real properties included within the subset;
determine an age of a first attribute value associated with the common attribute;
adjust the first attribute value based on the age;
represent the adjusted first attribute value as a visual representation according to a visual representation scale;
generate a geographic display, wherein the generated geographic display represents the visual representation as a non-opaque overlay on a geographic map; and
store the geographic display to a storage device.

16. The memory medium of claim 15, wherein the geographic display includes a processed overlay generated by performing image processing on the non-opaque overlay.

17. The memory medium of claim 15, wherein the image processing is performed on data objects representing the plurality of real properties included within the subset.

18. The memory medium of claim 15, wherein the non-opaque overlay is superimposed on the geographic map, wherein the geographic map includes geographic information in addition to the visual representations.

19. The memory medium of claim 15, wherein the instructions to identify the subsets of the plurality of real property further include instructions executable to:
receive a first search request from a user, the first search request specifying the boundary specifications and the common attribute.

20. The memory medium of claim 19, further including instructions executable to:
after the geographic display has been generated and stored, responsive to receiving a second search request corresponding to the first search request, retrieve the geographic display from the storage device.

21. The memory medium of claim 19, wherein the instructions to generate the geographic display further include instructions executable to:
add geographic features related to the first search request to the geographic map; and
remove geographic features unrelated to the first search request from the geographic map.

22. The memory medium of claim 15 further including instructions executable to:
derive the first attribute value from a plurality of data sources.

23. The memory medium of claim 22, wherein the plurality of data sources includes a multiple listing service and an additional data source.

24. The memory medium of claim 23, wherein the instructions to derive the first attribute value include instructions executable to:
receive the first attribute value from the multiple listing service; and
further wherein the instructions to adjust the first attribute value include instructions executable to update the first attribute value according to the additional data source.

* * * * *